United States Patent [19]

Lee

[11] 3,925,235

[45] Dec. 9, 1975

[54] PRODUCTION OF LUMINESCENCE

[75] Inventor: Vin-Jang Lee, Columbia, Mo.

[73] Assignee: The Curators of the University of Missouri, Columbia, Mo.

[22] Filed: Oct. 30, 1972

[21] Appl. No.: 302,359

[52] U.S. Cl. 252/188.3 CL; 252/301.4 R; 252/301.4 F; 252/301.6 F

[51] Int. Cl.² C09K 3/00

[58] Field of Search 252/188.3 R, 188.3 CL, 252/301.4 R, 301.4 F, 301.6 F

[56] References Cited

UNITED STATES PATENTS 3,493,889 2/1970 Henkel 252/188.3 CL

*Primary Examiner*—Stephen J. Lechert, Jr.
*Attorney, Agent, or Firm*—Koenig, Senniger, Powers and Leavitt

[57] ABSTRACT

A method and apparatus for continuous production of luminescence. A steady state heterogeneous charge transfer chemical reaction is carried out on the surface of a solid state catalyst such as an oxide semiconductor, at temperatures substantially below the temperature of incandescence of the catalytic material. Chemical energy is directly converted to light energy to provide continuous luminescence, which may be used at a position spaced from the solid state catalyst region where the luminescence is produced, e.g., for lasing, process monitoring, characterization of the activity and active sites of a catalyst, etc.

3 Claims, 2 Drawing Figures

PRODUCTION OF LUMINESCENCE

BACKGROUND OF THE INVENTION

The present invention relates to providing a continuous source of luminescence by a direct conversion of chemical energy to light energy, and more particularly to methods and apparatus for producing such luminescence by charge transfer chemical reactions on the surface of solid state catalysts.

Luminescence has been generated in several ways, such as by electroluminescence and chemical luminescence or chemiluminescence. In the former, light emission results from the conversion of electric energy into radiant energy, by the combination of electrons and holes in semiconductors. The mechanisms of the electronic transition are either direct interband transition or indirect via trapping centers with energy levels in the energy gap of the semiconductor in accordance with the known art of producing visible light from semiconductors as described, for example, in Science, Vol. 159, page 1419 (1968). Luminescence in a solid, especially in the bulk in contrast to the interface regions of a p-n junction, can also be generated by electrons and holes which are localized at nearest neighbor donor-acceptor centers, as described, for example, in *Physics Today*, February, 1968, page 43. In chemiluminescence light emission is a result of the direct conversion of the chemical energy into radiant energy by electronic transition from a higher energy state to a lower energy state in atoms and/or molecules all in a homogeneous phase. Transient luminescence generated by the adsorption of gases or vapors on solids has also been observed, as reviewed in, for example, Zietschrift fur Anorganische und Allgemeine Chemie, Band 377, page 113 (1970).

In addition to the many uses and applications of such luminescence as light sources, both electro- and chemiluminescence have been lased, i.e., the luminescence being amplified by stimulated emission of the radiation, the energy "pump" for the former including an external d.c. power source, while in the latter the energy "pump" is one or a series of chemical reactions involving intermolecular energy transfer. In the electrically pumped laser, e.g., the well known injection laser which is constituted by a forward biased p-n junction laser, the light energy output may be modulated by an electric field, but the electric energy which is the energy source must be provided by an external power supply. The above-noted chemical laser has the advantage of direct conversion of chemical to light energy but is not susceptible to modulation by an electric field.

SUMMARY OF THE INVENTION

Among the several objects of this invention is the provision of apparatus and methods for continuously producing luminescence by the direct conversion of chemical into light energy; the provision of such methods and apparatus which may be utilized for industrial process monitoring and for analytical purposes for detecting active sites on solid state catalysts; and such methods and apparatus for continuously producting luminescence which may be adapted for use in lasers which may be modulated and do not require the use of external electrical power supplies for energy pumping. Other objects and features will be in part apparent and in part pointed out hereinafter.

Briefly, and in accordance with this invention, luminescence is continuously produced by carrying out a steady state heterogeneous exothermic charge transfer chemical reaction on the surface of a solid state catalyst at temperatures substantially below the natural radiation temperature, or temperature of incandescence, of the catalyst material. Chemical energy is converted directly into light energy. It is to be understood that by the term light energy as used herein, is meant radiant energy not limited solely to visible light. This luminescence is utilized at a position spaced from the solid state catalyst region where the luminescence is produced.

GENERAL DESCRIPTION OF THE INVENTION

Typical exothermic chemical reactions which are useful in the practice of this invention include the oxidation of CO and $H_2$ and the decomposition of $N_2O$. Exemplary solid state catalysts which may be used are NiO, ZnO, $TiO_2$, $ThO_2$, CdO, $Cu_2O$, MgO and GaAs, which will be noted, include both semiconductors and insulators.

The heterogeneous exothermic charge transfer reactions employed in the practice of this invention may be described or depicted by two exemplary general mechanisms. The first mechanism may be depicted by the following exemplary steps and involves the injection of electrons and holes into the conduction and valence bands of semiconducting catalysts:

$$A + (S.C.) = A^- + p \text{ (Valence band)} \quad (1)$$
$$D + (S.C.) = D^+ + n \text{ (Conduction band)} \quad (2)$$
$$A^- + D^+ = AD + h\nu' \quad (3)$$
$$n + p = h\nu \quad (4)$$

where A and D denote respectively any acceptor and donor species (molecules, atoms or ions); *p* represents holes in the valence band of the semiconductor (represented by S.C.); *n* represents electrons in the conduction band of the same semiconductor; and $h\nu$ and $h\nu'$ represents respectively the photons emitted during the electron-hole recombination in the semiconductor and the ionic reaction on the surface of the catalyst.

Thus, from the above described mechanism, it is evident that the luminescence produced via the reactions (1) - (4) involves injection of electrons and of holes. However, this injection differs markedly from that utilized in producing electroluminescence and/or laser where the holes and electrons are the result of connecting negative and positive electrodes to an external electrical power supply and not due to the action of chemical agent or reactants A and D.

Light emission is a result of steps (3) and (4). The light emitted from (3) has the quantum energy of $$\left\{(E_A - E_D) + \frac{e^2}{\epsilon r}\right\}.$$

Where $E_A$, $E_D$ are the filled energy levels of the acceptors and donors, e is the electric charge, $\epsilon$ is the dielectric constant at the surface and *r* is the distance between the $A^-$ and $D^+$ adions. The light emitted from step (4) satisfies the relationship $h\nu \leq E_g$, where Eg is the energy gap of the semiconducting catalyst, and *h* is Planck's constant.

Another luminescence mechanism is by the following steps.

$$A + S_A^- = S_A + A \quad (5)$$
$$D + S_D^+ = S_D + D^+ \quad (6)$$
$$A^- + D^+ = AD + h\nu' \quad (7)$$
$$S_A + S_D = S_A^- + S_D^+ + h\nu \quad (8)$$

where $S_A$ and $S_D$ respectively are acceptor and donor surface states and are near neighbors. The mechanism is similar to that in the bulk (2). This luminescence mechanism is applicable to wide band semiconducting and insulating solid state catalysts.

The above general mechanisms describe or depict the charge transfer chemical reactions of the present invention on solid state catalysts and involve the injection of holes and of electrons into the body of the solid state catalyst and/or the exchange of electrons and holes with the surface states of the catalyst wherein they are combined thereby directly converting chemical energy into radiant energy. This is novel in respect to both chemical luminescence and electroluminescence. It represents rather a synthesis of the two mechanisms. Moreover, the transient luminescence produced by the adsorption of gases and vapors mentioned above, where a chemical reaction is not involved, the emission of light in adsorption lasts generally in the order of one to several seconds, commencing from adsorption on a clean surface to a fully covered one. But the luminescence produced in the present invention is always associated with an exothermic charge transfer chemical reaction at solid state catalytic surfaces. A steady emission of light is readily maintained. The luminescence produced or generated by these charge transfer chemical reactions on solid state catalysts is adapted for lasing utilization in what may be regarded as a chemical injection laser. That is, such laser action would involve the injection of electrons and of holes into a semiconductor catalyst by charge-transfer chemical reaction on the catalytic surface. In other words, the energy pump of such chemical injection laser is an exothermic chemical reaction and the light emission mechanism is by electron and hole injections followed by direct or indirect transitions in the semiconductor catalyst. Hence, such a chemical injection laser is a consequence of charge transfer catalysis on semiconductors. The catalyst in this case serves as an energy converter which converts chemical energy into light energy.

In adapting the luminescence produced by the charge transfer reactions of this invention to a chemical injection laser, reference is made to the conventional forward biased p-n junction laser as described, for example, in the book "Lasers," chapter 3, "The Injection Laser," page 257, A. K. Levin, Editor, Marcel Dekker, Inc., New York, 1968. There electrons are injected into the p- side and holes into the n- side of the p-n junction by an external d.c. power source. Light is emitted as a result of electron-hole recombination, interband transition, or transition via impurity levels. The active region for light emission is in the region of a diffusion length at either side of the p-n junction. The laser action is a consequence of the fact that the recombination transition can be influenced by light of the emission wave length concentrated on the p-n junction. This additional light stimulates (i.e., enhances) the electron-hole recombinations such that the total emission is a sum of the incident light and the emitted light from p-n junction. Hence, the p-n junction is a sort of light amplifier, and the phenomenon is termed "light amplification by stimulated emission of radiation," i.e., laser. In this known injection laser, the p-n junction serves as an energy converter which converts an external electric energy into light energy. The p-n junction along with its power supply is referred to as the "energy pump." By analogy with this known art of laser generation by polishing, the chemical injection laser can also be stimulated by polishing the sides of the semiconductor catalyst, if the electron-hole recombination by interband or indirect transition is the slow step, i.e., that step of the several involved which requires a greater time to occur. Furthermore, since the charge-transfer catalytic reaction may be influenced by the application of an electric field normal to the catalyst surface, the chemical injection laser can, in principal, be modulated.

DESCRIPTION OF PREFERRED EMBODIMENTS

Referring now more particularly to the drawings, apparatus of the present invention is shown to include a reactor R including a furnace F in which the exothermic reactions are carried out on a solid state catalyst K supported within the furnace. The reactant gases are admitted as indicated and, by proper positioning of a valve VI, are caused to flow into reactor R via a liquid nitrogen trap P. After contacting catalyst K the reactant gases and reaction products may be recirculated by pump C as indicated by the solid line arrows or may be continuously removed by opening an exhaust valve V2 connected to a vacuum line as indicated by the dash-dot arrow. A manometer M is employed to monitor the system pressure and a thermoelectric probe S and a thermocouple T are positioned in contact with the catalyst body for sensing or monitoring. The luminescence produced on catalyst K is transmitted through a window W, as indicated by the dashed line arrow and mirror A, to a position spaced from the catalyst zone where it was produced, for utilization thereof.

EXAMPLES

Figure 1:
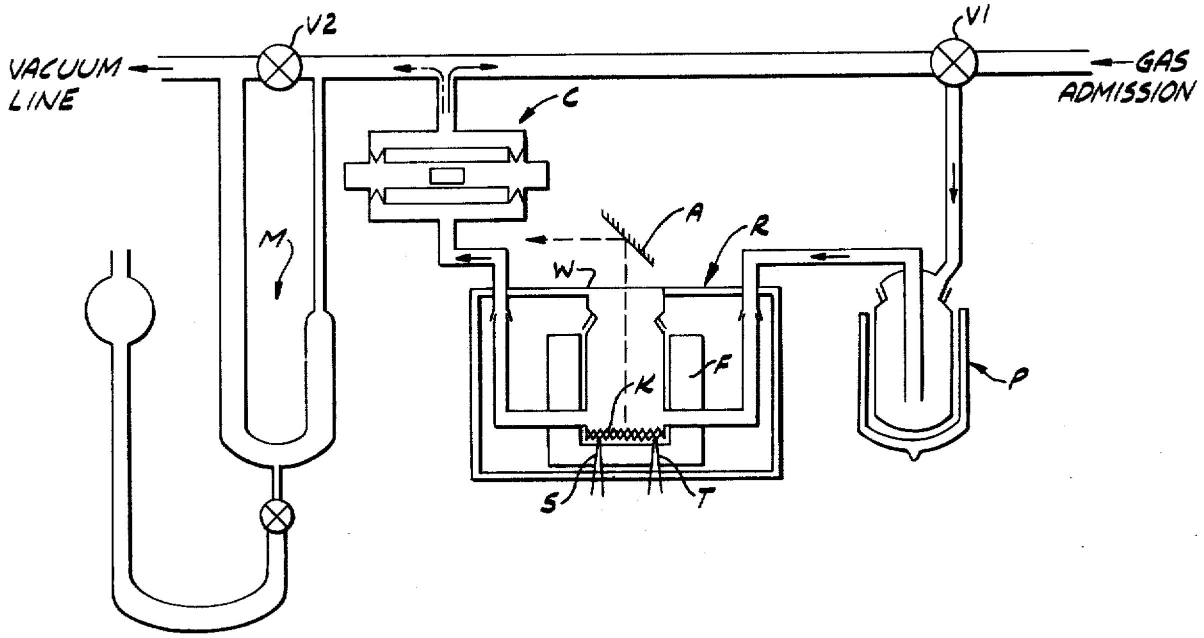
FIG. 1 is a diagrammatic view of apparatus of the present invention utilized to carry out the methods thereof wherein luminescence is continuously produced by a steady state heterogeneous exothermic charge transfer chemical reaction on the surface of a solid state catalyst.
Figure 2:
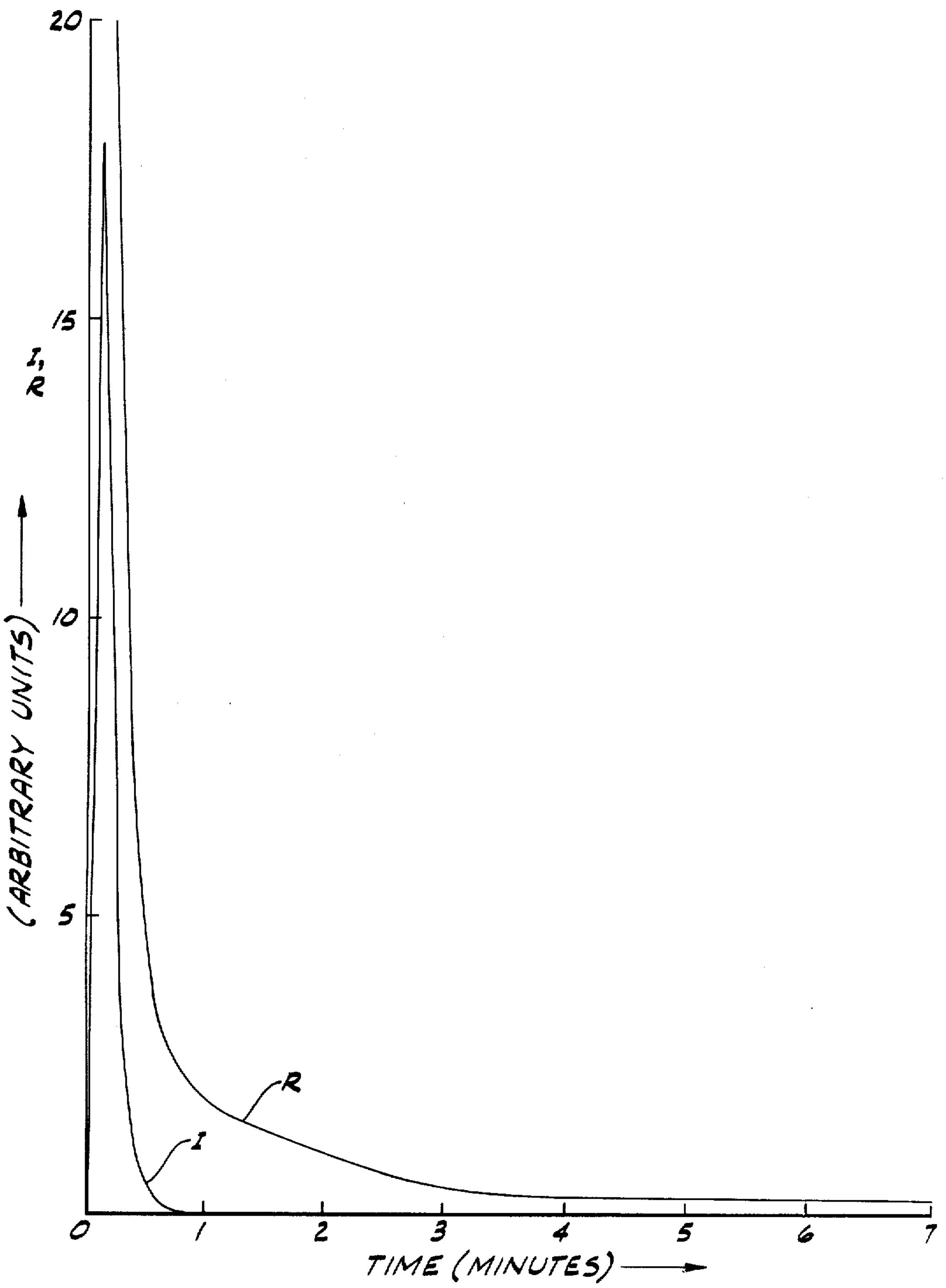
FIG. 2 is a graphical representation of the reaction rate and intensity of the luminescence produced in accordance with this invention, demonstrating that the intensity of luminescence is a direct function of or proportional to the rate of the exothermic reaction.

The heterogeneous exothermic charge transfer reaction comprising the oxidation of carbon monoxide to carbon dioxide was carried out in the apparatus of FIG. 1 using nickel oxide (polycrystalline with an average diameter of 1 mil) as the solid state catalyst. Before the admission of a stoichiometric mixture of CO and $O_2$ the reactor system was evacuated to a residual pressure of $10^{-6}$ torr. The reaction mixture at a pressure of 300 torr. was then admitted into reactor R with actuation of pump C. The temperature at the catalyst bed varied from room temperature to 260°C. The rate of reaction $$CO + \frac{1}{2}O_2 \rightarrow CO_2$$

was monitored by measuring the pressure drop, noting that the $CO_2$ reaction product was continuously removed by the liquid nitrogen trap P. The luminescence produced from the catalyst bed during this charge transfer reaction was readily visible to the naked eye as an orange-colored light emission. The intensity I of this emitted light during this reaction at a catalyst bed temperature of 150°C was measured by a photomultiplier (available under the trade designation Amperex XP 1002) with a spectral response of type T (or S20) connected to a photometer (available under the trade designation Pacific Photometric Instruments, Model 18). Both the intensity I of the luminescence of the light produced and the reaction rate R were plotted against time as graphically represented in FIG. 2, which curves demonstrate that the light intensity is proportional to the rate of the exothermic charge transfer reaction. The mechanisms of the light emission resulting from this CO oxidation may be in accordance with reactions (1) - (4) or (5) - (8). For reactions (1) - (4), the analogous sequence would be:

$$\tfrac{1}{2} O_2 = O^- + p \quad (9)$$
$$CO = CO^+ + n \quad (10)$$
$$O^- + CO^+ = CO_2 + h\nu' \quad (11)$$
$$n + p = h\nu \quad (12)$$

Reactions (9) and (10) are the hole and electron injection steps, respectively. Reactions (11) and (12) are the light emission steps by ionic reaction on the catalytic surface and the electron-hole recombination step in the semiconductor catalyst, respectively.

Similar CO oxidation reactions were carried out on ZnO, $ThO_2$, and CdO, $Cu_2O$, and mixed oxide catalysts. Results were similar to that of FIG. 2.

Oxidation of hydrogen to water was carried out at 300°C in the apparatus of FIG. 1 on ZnO and NiO solid state catalysts. Results are similar to that of CO oxidation represented by FIG. 2. The generalized mechanisms represented by reactions (1) - (4) and (5) - (8) were again applicable. For example, $$\tfrac{1}{2} H_2 = H^+ + n \quad (13)$$
$$\tfrac{1}{2} O_2 = O^- + p \quad (14)$$
$$n + p = h\nu \quad (15)$$
$$O^- + H^+ = OH \quad (16)$$
$$OH = OH^- + p \quad (17)$$
$$\tfrac{1}{2} H_2 = H^+ + n \quad (18)$$
$$n + p = h\nu \quad (19)$$
$$OH^- + H^+ = H_2O + h\nu 2 \quad (20)$$

The overall reaction is, of course, $$H_2 + \tfrac{1}{2} O_2 = H_2O + 2h\nu + h\nu_1 + h\nu_2 \quad (21)$$

The above described examples involve two reactants. Exothermic decomposition reactions were also carried out in the reactor system of FIG. 1 at temperatures of 260°C. Light emission was again observed. The emission mechanism may also be in accordance with reactions (1) - (4) or reactions (5) - (8). For example, using reactions (1) - (4), one obtains:

$$N_2O = N_2 + O^- + p \quad (22)$$
$$N_2O + O^- = N_2 + O_2^- \quad (23)$$
$$O_2^- = O_2 + n \quad (24)$$
$$p + n = h\nu \quad (25)$$

Here $O_2^-$ ion serves as an electron injector.

These examples illustrate that reactions (1) - (4) represent a general mechanism of producing luminescence by charge transfer catalysis on semiconductors. On insulators, such as MgO, the mechanisms represented by reactions (5) - (8) are applicable.

Thus it can be seen that luminescence can be produced in accordance with the present invention by direct conversion of chemical energy to light energy without the need of an electrical power supply. Chemical processes which involve gaseous components can be monitored where luminescence is produced by a charge transfer chemical reaction at a solid state catalytic surface. The light intensity thus produced is proportional to the gaseous component in such a process being monitored, and this monitoring method may be used rather than gas chromatography in such instances.

Moreover, the luminescence produced during the charge-transfer catalysis at solid state surfaces is useful to characterize the catalytic activity and active sites of the catalyst. Presently the characterization of catalytic activity and/or active sites of a catalytic surface is by means of extensive catalytic and adsorption studies. The determination of active sites on a catalyst by this disclosed light emission during catalytic reaction involving charge transfer is unique and direct. In accordance with this application of the present invention it is possible to visually "count" the active sites by means of photography. Further, with suitable arrangement of catalytic surfaces and polishing thereof as noted above, light emitted from one surfaace may be used to stimulate light emission of other surfaces and an avalanche multiplication of light emission may be produced in a chemical injection laser to produce high intensity monochromatic light.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A process for continuously producing luminescence comprising carrying out a heterogeneous exothermic charge transfer chemical reaction of at least one reactant in a fluid phase on the surface of a solid state catalyst at temperatures substantially below the temperature of incandescence of the catalyst wherein chemical energy is directly converted into light energy continuously to produce luminescence, and utilizing the luminescence thus produced at a position spaced from the solid state catalytic surface where the luminescence is produced.

2. A process as set forth in claim 1 in which said solid state catalyst is a semiconductor material.

3. A process as set forth in claim 2 in which said reaction is an oxidation reaction.

* * * * *